United States Patent [19]

Wagner et al.

[11] 4,130,491

[45] Dec. 19, 1978

[54] USE OF BETAINES IN MINERAL OIL RECOVERY

[76] Inventors: Helmut Wagner, Bachstrasse 2, 6834 Ketsch; Hans-Joachim Neumann, Neuköllnerweg 4, 3340 Wolfenbuttel, both of Germany

[21] Appl. No.: 705,766

[22] Filed: Jul. 16, 1976

[30] Foreign Application Priority Data

Jul. 19, 1975 [DE] Fed. Rep. of Germany ....... 2532469

[51] Int. Cl.$^2$ ............................................. E21B 43/22
[52] U.S. Cl. ............................... 252/8.55 D; 166/275; 260/501.13; 548/349; 548/354
[58] Field of Search ..................... 252/8.55 D, 8.55 B, 252/DIG. 7; 260/501.13; 166/275, 274

[56] References Cited

U.S. PATENT DOCUMENTS

| | | | |
|---|---|---|---|
| 2,129,264 | 9/1938 | Downing et al. | 260/501.13 |
| 2,528,378 | 10/1950 | Mannheimer | 252/542 X |
| 3,275,552 | 9/1966 | Kern et al. | 252/8.55 |
| 3,360,550 | 12/1967 | Cowen et al. | 260/501.13 |
| 3,792,731 | 2/1974 | Feuerbacher et al. | 166/274 |
| 3,811,505 | 5/1974 | Flournoy et al. | 166/274 |
| 3,939,911 | 2/1976 | Maddox et al. | 166/274 |

*Primary Examiner*—Herbert B. Guynn
*Attorney, Agent, or Firm*—Toren, McGeady and Stanger

[57] ABSTRACT

A method for recovering mineral oil from oil deposits utilizing conventional flooding techniques wherein the deposit is flooded with water forcing the oil to the surface of the water or absorbing the oil in the water by use of certain additives and then recovering the oil from the flooded water wherein the aqueous flooding solution contains a surface active betaine containing as a hydrophilic residue at least one quaternary ammonium group capable of intramolecular formation of an internal salt with an acid group, and an oleophilic residue composed of at least one residue of naphthenic acids. The surface active betaines provide improved recovery of oils from such mineral deposits.

1 Claim, No Drawings

USE OF BETAINES IN MINERAL OIL RECOVERY

BACKGROUND OF THE INVENTION

In the extraction of mineral oil deposits, it is general to differentiate between three recovery phases.

In phase I, the naturally occurring propelling forces are used for transport. The main force used is water pressure which is caused by the pressure of the edge water and/or the expansion of the edge water. The gas pressure of the expanding gas gap and/or the expanding gases dissolved in the oil are also used. In addition, the oil expansion pressure and gravity must be included with the naturally propelling forces.

If the above-mentioned forces are insufficient for the economic transport of the oil and especially, if the edge water is no longer capable of equalizing the pressure drop caused by the transport of oil, then phase II secondary measures are employed. Such secondary measures are, for example, the mechanical control of the pore content by forcing in gas or air or rather gas or water and/or exhausting gas.

A further possibility resides in increasing the surface area of the pore system, e.g., mechanically, by torpedoing, or chemically through the use of acids. A further measure consists of altering the physical forces of the contents and walls of the pores by bacterial activity, heat and especially, by the addition of surface active materials. In the secondary recovery step, these surface active materials are added to the flood water.

The phase II processes are no longer used when the costs of the measures used in this phase equal or exceed the value of the transported oil or products derived therefrom.

Most recently, tertiary transport measures, the so-called phase III methods, have attained particular importance since the extent of the oil recovery from the deposits at the conclusion of phase II is generally only about 33%.

The measures of phase III can be divided into various processes of which the technique of chemical water flooding is of particular importance. The term, chemical water flooding, is understood to mean (a) polymer flooding, in which particularly polyelectrolytes, such as, partially hydrolyzed polyacrylamides or ionic polysaccharides, are added to the flood water;

(b) surfactant flooding, whereby substances that lower surface tension, especially petroleum sulfonates, are added to the flood water;

(c) alkali flooding, whereby the acidic substances, present in the mineral oil are neutralized by the addition of alkali solutions to the flood water and the surface tension is thereby affected;

(d) micellar flooding, in which high concentrations of surface active materials, especially of petroleum sulfonates, are used in order to incorporate the mineral oil in micelles and to transport it in the form of finely divided emulsions;

(e) emulsion flooding, whereby emulsions are pumped into the deposits and (f) foam flooding, in which initially a surfactant is forced into the deposits and foam is then formed by the subsequent injection of gas into the deposits.

Detailed literature, dealing with the problems, especially with secondary and tertiary mineral oil transport, can be found in the Kompendium 74/75 des Industrieverlages von Hernhaussen KG, 1975, in which the papers presented at the 24th Meeting of the Deutschen Gesellschaft für Mineralölwissenschaft und Kohlechemie e.V. (German Association for Mineral Oil Science and Coal Chemistry) are reproduced (especially Page 156 ff.).

It can be seen from the preceding that surface active substances play an important role in the transport of mineral oil, especially in phases II and III. The petroleum sulfonates, which are the surfactants that are primarily used for this purpose, have the advantage of low price but the disadvantage of sensitivity especially towards multivalent cations. Calcium and magnesium salts of these compounds are not water soluble and dissolve preferentially in the oil phase. However, since mineral oil and salt deposits are frequently encountered together and the water, found in the deposits, has a high electrolyte content, the abovementioned, cheaper sulfonates can only be used within the limits set by their solubility.

Cationic, surface active materials, such as, for example, quaternary ammonium salts, derivatives of fatty amines and polyamines, have also already been used. However, these compounds have the disadvantage of substantivity or attraction especially towards silicate rock and they lose their activity by adsorption.

The well known non-ionic surface active materials do have the advantage of relative insensitivity towards electrolytes, even if their solubility in water is also reduced by electrolytes, and they do not show the marked substantivity of cationic compounds. This class of compounds, especially the addition products of ethylene oxide with compounds containing active hydrogen, is however, relatively expensive and has limited activity. In addition, the compounds hinder the de-emulsification of the transported oil/water emulsion. Detailed literature concerning the most important surface active substances that have been used up to the present, can be found in the Enzyklopädie der technischen Chemie of Ullman (Ullman's Encyclopedia of Chemical Technology), Vol. 6, Page 568 ff.

SUMMARY OF THE INVENTION

The object of the present invention is to find surface active substances which are particularly suited for the purpose of mineral oil recovery and which can be employed especially in phases II and III in the flooding measures. These compounds, when present in small concentrations, should decrease the surface tension to the greatest extent possible, confer good penetrating properties to the aqueous solution and, with the mineral oil present in the deposits, form transportable dispersions which, however, at the conclusion of the transport, can be de-emulsified again in a simple manner. The surface active materials should not be sensitive towards electrolytes and should be adsorbed as little as possible on rock.

Surprisingly, we have found that these properties are obtained with surface active betaines, which contain a hydrophilic residue of at least one quaternary ammonium group which is capable of forming intramolecularly with an acid group, preferably a carboxyl group, an internal salt and an oleophilic residue of at least one residue derived from naphthenic acids.

The betaines of the present invention are used to improve the recovery of oil from mineral oil deposits by flooding techniques. This is accomplished by flooding the deposit with an aqueous solution containing from about 0.001 to 10% by weight of the betaine.

DESCRIPTION OF THE PREFERRED EMBODIMENT

The term naphthenic acids as used herein is understood to mean the natural acids which are obtained from crude oils by extraction with alkali and subsequent acidification. These are generally mixtures in which cyclopentane and cyclohexane carboxylic acids predominate ("Erdöllexikon" -Mineral Oil Encyclopedia), Dr. Alfred Hüttig, Verlag Heidelberg, Page 192).

Naphthenic acids which have an acid number of 80 to 350 and preferably 120 to 250, are suitable for the synthesis of betaines to be used in accordance with the invention.

In the following formulas, $R^1$ stands for the naphthenic acid residue. This residue $R^1$ contains the $C=O$ group, which originates from the carboxyl group. Special mention is made whenever this residue does not contain the $C=O$ group.

Examples of the betaines for use in the present invention are shown by formula I:

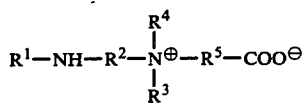

wherein $R^1$ is the acid residue, derived from the naphthenic acids, $R^2$ is an alkylene residue with 2 to 6 carbon atoms, $R^3$ and $R^4$ may be the same or different and preferably represent a low molecular weight alkyl residue, especially a straight-chain alkyl residue with 1 to 4 carbon atoms, $R^5$ is an alkylene residue with preferably 1 to 3 carbon atoms.

A further example corresponds to the following structure:

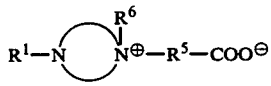

The two nitrogen atoms here are constituents of a heterocyclic ring, e.g., piperazine. $R^6$ corresponds in its meaning to the $R^3$ or $R^4$ residue of formula I. The $R^1$ and $R^5$ residues have the above-mentioned meaning. To someone skilled in the art, it is obvious that a further carboxyl group, if necessary separated from the nitrogen by an alkylene group, can be introduced at the tertiary nitrogen under quaternizing conditions.

It is furthermore possible to react the above-described naphthenic acid with polyamines of the ethylenediamine or propylenediamine series, initially forming the acid amide. When using a polyamine of the ethylenediamine series, imidazoline derivatives of formula III

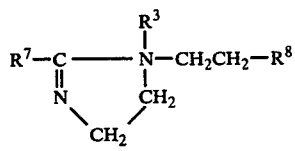

are obtained in a further reaction step. In the above, $R^7$ represents a naphthenic acid residue remaining after the carboxyl group has been removed. Since it represents the residue remaining after the carboxyl group has been removed in its entirety, the naphthenic acid residue $R^7$ does not contain the $C=O$ group. $R^3$ has the above-given meaning. If one starts with diethylenetriamine, then $R^8$ is an amino group. If longer-chain polyamines are used, the polyamine chain is continued with the substituent $R^8$, which is then either a long-chain polyamine residue or possibly is present in cyclized form just as the remaining half of the molecule. If aminoethylethanolamine is used as the starting point, then $R^8$ is a hydroxyl group.

On reacting with propylenediamine derivatives, tetrahydropyrimidine derivatives are obtained in analogous manner. These are, for example, compounds having the following formula

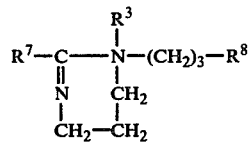

in which the $R^3$, $R^7$ and $R^8$ residues have the meaning already given.

The betaines can be synthesized by methods which are known per se, by reacting naphthenic acids with the corresponding amines and by quaternizing the process products also by known procedures, e.g., with halogen-carboxylic acids. Such reactions are described, for example, in the book "Cationic Surfactants", Volume 4, by Eric Jungermann, 1970, Marcel Deekka, Inc., New York, Page 3 ff. and Page 71 ff., and in the book "Surface Active Agents", Interscience Publishers, Inc., New York 1949, Page 218 ff., or can be found in any chemical handbook.

The surface active betaines, to be used in accordance with the invention, should be contained in the flooding water in an amount of 0.001 to 10% by weight.

The control of the surface active properties by the pH of the solution is of particular importance. By regulating the pH to the specific value of the betaine used, which corresponds to the amphoteric tenside structure, it is possible to adjust to a range of maximum surface tension lowering, e.g., at the water/oil or oil/water interface, or to a range of particularly good dispersing properties. Accordingly, it is for example possible to achieve with one flooding agent, initially an optimum wetting of the rock which is primarily wetted by the mineral oil, and to regulate the pH in a second flooding in such a way, that conditions are adjusted for optimum dispersion and adequate dispersion stability. By changing the pH, the mineral oil can easily again be separated from the transported oil/water dispersion.

It was thereby surprising to someone skilled in the art that the inventive betaine derivatives of naphthenic acids were especially suitable. A particular advantage of the naphthenic acids lies therein that they are available cheaply and in sufficient quantity.

The following examples serve for the purpose of further illustrating the object of the invention.

A. Synthesis of Inventive Compounds

EXAMPLE 1

420 g naphthenic acid (acid number 200, saponification number 200, corresponding to a molecular weight of 280.5) are reacted with 240 g dimethylaminopropylamine at 200° C. during 5 hours to form the amide. Towards the end of the reaction, when the acid number was less than 7, excess amine was removed under a vacuum of 20 torr from the product.

The yield mounted to 540 g of the naphthenic amide of dimethylaminopropylamine with a molecular weight of ca. 360.

360 g of this amide were subsequently converted to the betaine in 913 g water, containing 119 g sodium monochloroacetate, during the course of 3 hours at 95°–100° C.

For a degree of conversion of 99%, the 30% naphthenic acid - betaine solution has a pH of 6.05.

The process product can be characterized by the following formula:

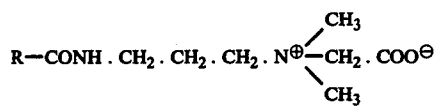

R—COOH = naphthenic acid

EXAMPLE 2

455 g naphthenic acid (acid number 80, saponification number 86.5 corresponding to a molecular weight of 650) were amidized with 240 g dimethylaminopropylamine at 200° C., initially at normal pressure and towards the end of the reaction under a vacuum of 20 torr.

The yield was 503 g of the naphthenic acid amide of dimethylaminopropylamine, having a molecular weight of ca. 719.

359.5 g of this compound in 874 g water, which contained 59.5 g of sodium monochloroacetate, were reacted within 3 hours at 95°–100° C. to the betaine.

For a degree of conversion of 99.1%, the 30% naphthenic acid - betaine solution has a pH of 6.9.

The process product can be characterized by the following formula:

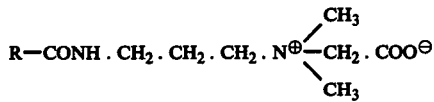

R—COOH = Naphthenic acid

EXAMPLE 3

796.4 g naphthenic acid (acid number 155 corresponding to a molecular weight of 352) are reacted with 250 g aminoethylethanolamine in 250 g xylene at temperatures between 145° and 165° C. during 18 hours to form the hydroxyethylimidazoline, the water formed during the reaction being removed azeotropically.

The yield was 909 g; the molecular weight was ca. 420. The reaction was monitored with the help of infrared spectroscopy.

420 g of the imidazoline obtained were converted with 116.6 g sodium monochloreacetat dissolved in 1056.6 g water during 3.5 hours at 95°–100° C. to form the betaine.

For a degree of conversion of 98.8%, the 30% naphthenic acid - betaine solution had a pH of 6.2.

The process product can be characterized by the following formula:

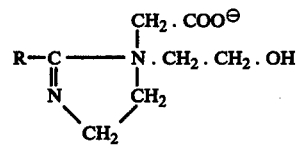

R is the residue remaining after removal of the carboxyl group from the naphthenic acid R—COOH.

EXAMPLE 4

710 g naphthenic acid (acid number 155 corresponding to a molecular weight of 352) were reacted with 227 g tetraethylenepentamine in 350 g xylene at temperatures between 145° and 165° C. during 36 hours, to form the diimidazoline, the water formed during the reaction being removed by azeotropical distillation. The molecular weight of the reaction product was 829.

414 g of this diimidazoline were converted with 116 g of the sodium salt of monochloroacetic acid, dissolved in 1049 g water, during 4.5 hours at 95°–100° C. into the dibetaine.

For a degree of conversion of 98.5%, the 30% naphthenic acid - betaine solution had a pH of 6.0.

The process product can be characterized by the following formula:

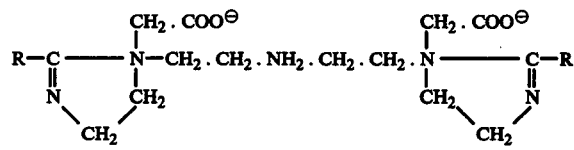

R is the residue remaining after removal of the carboxyl group from the naphthenic acid R—COOH.

B. Use of the Inventive Compounds

EXAMPLE 5

The test for surface activity was carried out in a simplified flooding experiment approximating the conditions prevalent in deposits.

It is well known that, inter alia, the length of a flooded core and the pressure gradient have an effect on the degree of oil removal. In order largely to exclude these effects, a pressure gradient of 0.1–0.2 atm/m should be attained in the experiments.

Since cores of such a length are not available, extracted drilling cores must be broken up and shaken into a steel pipe of 100 cm length and 13.8 cm diameter. The ends of the pores are closed off with large-pored frits, in order to prevent the core material being washed out. The air permeability and the porosity towards synthetic formation water were determined.

An oil with a density $d_{20}$ = 0.802 and a viscosity $\eta_{20}$ = 1.925cP, was used as the test oil. The viscosity was adjusted to the desired value by the addition of 30 to 50% by weight of gasoline. Experience has shown that such an addition does not alter the interfacial properties of oil.

In different experiments, the oil saturation of the core-filled pipe (made from extracted and broken-up drilling cores with an air permeability of ca. 3500 mD, a porosity of 42.5% and a clay content of 3.1) varied between 0.71 and 0.83 PV (pore volumes).

Flooding was carried out with synthetic formation water having a salinity of 20% and a viscosity of 1430 cP ($\eta_{20}$).

(a) Flooding Water without Betaine

| after 1 – 2 PV | ca. 73% of the recoverable oil |
|---|---|
| after   3 PV | no further effect |

(b) Flooding Water with 0.1% by weight Betaine with a pH of 6.39

| after 2 PV | ca. 69% of the recoverable oil |
|---|---|
| after 5 PV | ca. 73% of the recoverable oil |
| after 10 PV | ca. 82% of the recoverable oil |

(c) Flooding Water without Betaine Addition Subsequently Flooding Water + 1% by Weight Betaine with a pH of 6.39

| after 2 PV | ca. 82% of the recoverable oil |
|---|---|
| after 5 PV | ca. 91% of the recoverable oil |
| after 10 PV | ca. 96% of the recoverable oil |

The composition of the betaine, used under (b) and (c) corresponds to that of Example 1.

What is claimed is:

1. In a method for recovering mineral oil from deposits thereof wherein the deposit is flooded with an aqueous solution and the oil is then recovered from the flooding water, the improvement which comprises employing as said aqueous flooding solution an aqueous solution containing from about 0.001 to 10% by weight of a surface active betaine having the formula:

wherein
$R^1$ is the acyl radical from naphthenic acids,
$R^2$ is an alkylene residue with 2 to 6 carbon atoms,
$R^3$ and $R^4$ may be the same or different and are low molecular weight alkyl residues, and
$R^5$ is an alkylene residue with 1 to 3 carbon atoms.